(12) United States Patent
Mizuno et al.

(10) Patent No.: US 7,798,334 B2
(45) Date of Patent: Sep. 21, 2010

(54) METHOD AND APPARATUS FOR MANUFACTURING ZEOLITE MEMBRANE, AND ZEOLITE TUBULAR SEPARATION MEMBRANE PROVIDED BY THE METHOD

(75) Inventors: Takehito Mizuno, Tokyo (JP); Ryoki Sato, Tokyo (JP); Hiroyuki Chida, Tokyo (JP); Kiminori Sato, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 357 days.

(21) Appl. No.: 10/566,581

(22) PCT Filed: Aug. 5, 2004

(86) PCT No.: PCT/JP2004/011273
§ 371 (c)(1), (2), (4) Date: Jan. 31, 2006

(87) PCT Pub. No.: WO2005/014481
PCT Pub. Date: Feb. 17, 2005

(65) Prior Publication Data
US 2006/0237360 A1    Oct. 26, 2006

(30) Foreign Application Priority Data
Aug. 6, 2003    (JP) .............................. 2003-288010

(51) Int. Cl.
*B01D 71/02*    (2006.01)
*B01D 61/00*    (2006.01)

(52) U.S. Cl. ............................. 210/500.22; 210/500.23; 210/509

(58) Field of Classification Search ....................... None
See application file for complete search history.

(56) References Cited

U.S. PATENT DOCUMENTS 5,554,286 A    9/1996    Okamoto et al.

(Continued)

FOREIGN PATENT DOCUMENTS

EP    1 129 767 A1    9/2001

(Continued)

OTHER PUBLICATIONS

Zamaro et al, "Growth of mordenite on monoliths by secondary synthesis effects of the substrate on coating structure and catalytic activity", ScienceDirect, Elsevier, 314 (2006) 101-113.*

*Primary Examiner*—Krishnan S Menon
(74) *Attorney, Agent, or Firm*—Sughrue Mion, PLLC

(57) ABSTRACT

A process for manufacturing a zeolite membrane by hydrothermal synthesis on the surface of a porous tubular support 3 with both ends open, by adding a reaction solution containing a silica source and an alumina source and the porous tubular support 3 into a lengthwise reaction container 1 longer than the porous tubular support 3 while placing the porous tubular support 3 vertically in the reaction container 1 and substantially apart from the inner surface of the reaction container 1, and immersing the porous tubular support 3 completely in the reaction solution so that the inside of the porous tubular support 3 is filled with the reaction solution; and heating the reaction solution under conditions of leaving the top and bottom ends of the porous tubular support 3 open, and an apparatus using thereof and zeolite tubular separation membranes thus obtained.

1 Claim, 12 Drawing Sheets

U.S. PATENT DOCUMENTS

| | | | |
|---|---|---|---|
| 5,753,121 A | * 5/1998 | Geus et al. | 210/490 |
| 5,871,650 A | * 2/1999 | Lai et al. | 210/653 |
| 2001/0012505 A1 | * 8/2001 | Matsukata | 423/710 |

FOREIGN PATENT DOCUMENTS

| JP | 07330326 A | * 12/1995 |
| --- | --- | --- |
| JP | 9-202615 A | 8/1997 |
| JP | 2001-240411 A | 9/2001 |
| JP | 3272119 B2 | 1/2002 |
| JP | 2003-144871 A | 5/2003 |
| WO | WO 00/21648 | 4/2000 |

* cited by examiner 20.0 μm 10.0 μm

1 μm

50nm

|—————————|
10.0 μm

|————|
2.00 μm

METHOD AND APPARATUS FOR MANUFACTURING ZEOLITE MEMBRANE, AND ZEOLITE TUBULAR SEPARATION MEMBRANE PROVIDED BY THE METHOD

This application claims priority from PCT Application No. PCT/JP2004/011273 filed Aug. 5, 2004 and from Japanese Application No. 2003-288010 filed Aug. 6, 2003, which applications are incorporated herein by reference.

TECHNICAL FIELD

The present invention relates to a process and apparatus for manufacturing a zeolite membrane which has fewer defects and higher separation performance, and is therefore suitable for molecular sieves or the like, and to a zeolite tubular separation membrane obtained by the process.

BACKGROUND ART

Zeolites are crystalline alumino silicates which embrace pores of the order of molecular sizes, and membranes made up of zeorites are widely used as molecular sieves because of their property of selectively allowing molecules to pass through themselves depending on the molecular size or shape. Particularly, their use as membranes for separating water from organic solvents, especially, as membranes for separating water from alcohols has attracted considerable attention these days. Zeolite membranes, which function as separation membranes, do not have sufficient mechanical strength in themselves, and therefore they are usually used in form of supporting with a porous support which is made of ceramics etc.

Zeolite membranes supported by porous supports have been manufactured by hydrothermal synthesis method in such a manner that porous supports are immersed in the respective raw materials that contain a silica source and an alumina source as main ingredients. Once a porous support is immersed in a slurry of a raw material that contains a silica source and an alumina source, a zeolite membrane is grown and formed with the aid of fine zeolite seed crystals, as nuclei, in the slurry. Thus, it is necessitated that the slurry is to be supersaturated with the raw material zeolite.

However, when a porous substrate is immersed in a slurry supersaturated with a zeolite raw material, fine zeolite seed crystals are attached to the surface of the porous substrate to cause the growth of a zeolite membrane, and, large zeolite crystals which have been hugely grown in the slurry are also attached to the surface of the porous support and from where the zeolite membrane are also grown. The zeolite membrane thus formed is not uniform in pore size and thickness, and it gives rise to a problem of being apt to have pinholes. Thus, when intending to prepare a zeolite membrane on a porous substrate by hydrothermal reaction, it is preferable to carry the zeolite seed crystals on the porous substrate of ceramics, etc., in advance, and to set the concentration of the zeolite raw material in the slurry to a low level.

Japanese Patent No. 3272119 (Patent literature 1) discloses a process for manufacturing a zeolite crystal membrane which comprises the steps of: impregnating an alumina substrate with a slurry where zeolite crystals are suspended in a binder solution; rinsing and drying the alumina substrate in order to obtain the alumina substrate of which the surface and pores' inside have zeolite crystals attached, and then immersing the obtained alumina substrate in a reaction solution containing a zeolite precursor, which is followed by proceeding the hydrothermal synthesis in order to grow the zeolite crystals as a crystalline film. When preparing an A type zeolite membrane by this process, the alumina substrate is held in an autoclave at 70 to 90° C. for about 15 minutes to 12 hours. And when forming a ZSM-5 type zeolite membrane by this process, the alumina substrate is held in an autoclave at 160 to 200° C. for about 24 to 72 hours.

In this preparation process, a filter of alumina is used as a substrate and zeolite crystals attached on the surface of and on the pores' inside of the substrate are allowed to grow in the reaction solution. Thus, the concentration of the zeolite raw material in the slurry can be set low, and the growth of the zeolite crystals in the slurry can be decreased. The process, however, might cause the formation of zeolite membranes on both sides of the substrate. A separation membrane which has zeolite membranes formed on both sides thereof will bear a problem that its permeation rate is too low to have adequate separation ability.

JP-9-202615A (Patent literature 2) discloses a process for manufacturing a zeolite membrane which comprises the steps of: immersing in a sol for zeolite synthesis a cylindrical porous support of which outer side surface is sealed so that the outer side surface does not come into contact with the sol; evacuating a vessel containing the sol to 10 mmHg with a vacuum pump; keeping the container in such a state for 6 hours; and placing the porous support together with the sol in an autoclave to subject the same to hydrothermal synthesis at 170° C. for 72 hours. Since this process allows a zeolite membrane to be formed in the inside of the porous support, the zeolite membrane formed is hardly exfoliated from the support. However, when the zeolite membrane goes into the pores of the porous support, substantial thickness of the zeolite membrane becomes too large, which brings an excessive pressure loss.

JP-2001-240411A (Patent literature 3) discloses a process for manufacturing a zeolite membrane which includes the steps of: coating the surface of a porous substrate with a gel solution of mordenite (MOR) type zeolite crystals; placing the gel solution in a pressure container; and placing the tubular porous substrate vertically in the gel solution to subject the same to hydrothermal synthesis. When the porous substrate is placed in the gel solution so that the surface on which a zeolite membrane is to be formed is horizontal, an oriented MOR type zeolite membrane is hard to form on the top of the substrate, though it is formed on the underside of the substrate. In this process, however, the porous substrate is placed in the gel solution so that the surface on which a zeolite membrane is to be formed is vertical, a MOR type zeolite membrane whose b axis and c axis are oriented parallel to the substrate can be formed on the overall surface of the porous substrate.

In the meantime, part of the zeolite crystallites formed in the gel solution during hydrothermal synthesis is settled on the bottom of the container. And when sediment thus formed is attached locally on the porous substrate, a uniform zeolite membrane cannot be obtained. The process described in JP-2001-240411A, in which a porous substrate is placed vertically in a gel solution of a zeolite raw material, is likely to cause the attachment of such sediment on the bottom of the substrate. Thus, it gives rise to a problem of being unable to form a uniform zeolite membrane.

Besides the problems described as above, all the above described processes give rise to a problem of increased manufacturing cost when used to produce a large number of zeolite membranes or large-sized zeolite separation membranes, because a pressure container such as an autoclave is indispensable to them.

Patent Literature 1: Japanese Patent No. 3272119

Patent Literature 2: JP-9-202615A

Patent Literature 3: JP-2001-240411A

DISCLOSURE OF THE INVENTION

Problems to be Solved by the Invention

Accordingly, an object of the present invention is to provide a process and apparatus for manufacturing a zeolite membrane which enable the formation of a zeolite membrane having a high separation factor and permeation rate on the surface of a porous tubular substrate and are suitable for the mass production of zeolite membranes and the production of large-sized zeolite separation membranes, and to provide a zeolite tubular separation membrane obtained by the process.

Means for Solving the Problems

After our diligent studies for solving the above described object, the present inventors have found that (a) a zeolite membrane with a high separation performance is formed by a process for manufacturing a zeolite membrane by hydrothermal synthesis on a porous tubular support with both ends open, the process comprising placing the porous tubular support vertically in a reaction container containing a reaction solution and substantially apart from the inner surface of the reaction container, and then heating the reaction solution while keeping the porous tubular support filled with the reaction solution; (b) a zeolite membrane can be prepared without using an airtight container such as an autoclave, but using a heating apparatus which heats a reaction solution via a heating device surrounding a porous tubular support while keeping the porous tubular support completely immersed in the reaction solution and substantially apart from the inner surface of the reaction container; and (c) the zeolite separation membrane obtained by the above described process has a zeolite membrane substantially only on the outer surface of the porous tubular support and the zeolite membrane is thin. This has led to the completion of the present invention.

That is, the process for manufacturing a zeolite membrane according to the present invention is a process for manufacturing a zeolite membrane by hydrothermal synthesis on the surface of a porous tubular support with both ends open, characterized by: adding a reaction solution containing a silica source and an alumina source and the porous tubular support into a lengthwise reaction container longer than the porous tubular support while placing the porous tubular support vertically in the reaction container and substantially apart from the inner surface of the reaction container, and immersing the porous tubular support completely in the reaction solution so that the inside of the porous tubular support is filled with the reaction solution; and heating the reaction solution under conditions of leaving the top and bottom ends of the porous tubular support open.

To place the porous tubular support vertically in the reaction container and substantially apart from the inner surface of the reaction container, preferably the porous tubular support is suspended in the reaction solution by a holding member located at the top of the reaction container. Alternatively, the porous tubular support may be placed on a holding member provided on the bottom of the reaction container. In this case, the holding member needs to have such a structure that does not substantially block the bottom opening of the porous tubular support.

Preferably, only one porous tubular support of the above described type is placed in each of the above described reaction containers. Preferably, the reaction solution is heated in such a manner that the convection of the reaction solution occurs over the full length of the porous tubular support. Preferably, a jacket is provided on the periphery of the reaction container and the reaction solution is heated by feeding a heating medium to the jacket.

Preferably, the reaction solution level is 2 to 30 cm above the top of the porous tubular support placed. Preferably, the distance from the inner surface of the reaction container to the outer surface of the porous tubular support placed is 2 to 25 mm.

In one preferred embodiment of the process for manufacturing a zeolite membrane of the present invention, a transparent solution with a turbidity of 300 NTU or less is prepared as the reaction solution and the temperature at which the transparent solution is heated is adjusted to a temperature of lower than Tb and not lower than (Tb−50° C.), wherein Tb is the boiling temperature of the transparent solution. Preferably, the transparent solution is added into the reaction container at a temperature of lower than 35° C. and heated at a rate of 5 to 100° C./min.

In another preferred embodiment of the process for manufacturing a zeolite membrane of the present invention, the reaction solution is provided as a suspension and the suspension is boiled. Preferably, the suspension is added into the reaction container at a temperature of lower than 35° C. and heated at a rate of 5 to 100° C./min up to around the boiling temperature of the suspension and kept at around the boiling temperature.

The apparatus for manufacturing a zeolite membrane of the present invention is an apparatus for manufacturing a zeolite membrane, by hydrothermal synthesis on the surface of a porous tubular support with both ends open, characterized in that the apparatus comprises: (a) a reaction container which is longer than the porous tubular support and can accommodate a reaction solution containing a silica source and an alumina source and the porous tubular support; (b) a heating device which surrounds the porous tubular support; and (c) a holding device which holds the porous tubular support vertical in the reaction container, whereby the porous tubular support is completely immersed in the reaction solution and substantially apart from the inner surface of the reaction container, wherein the heating device being used for heating the reaction solution to form a zeolite membrane on the surface of the porous tubular support.

Preferably, the distance from the inner surface of the reaction container to the outer surface of the porous tubular support is 2 to 25 mm. Preferably, the height of the reaction container is larger than the length of the porous tubular support by 4 to 90 cm.

In one preferred embodiment of an apparatus for manufacturing a zeolite membrane of the present invention, the holding device is a clamp, which grips the top of the porous tubular support to allow the same to be suspended in the reaction solution.

In another preferred embodiment of an apparatus for manufacturing a zeolite membrane of the present invention, the holding device is a holding member on which the porous tubular support is placed, and has a structure that does not substantially block the bottom opening of the porous tubular support.

A zeolite tubular separation membrane of a first aspect according to the present invention comprises: a porous tubular support with both ends open; and a zeolite membrane formed on the surface of the porous tubular support, and is characterized in that 80% or more of the zeolite membrane is formed within 20 μm from the outer surface of the porous tubular support and substantially no zeolite membrane is formed on the inner surface of the porous tubular support.

A zeolite tubular separation membrane of a second aspect according to the present invention comprises: a porous tubular support with both ends open; and a zeolite membrane which comprises a plurality of zeolite single crystals and is formed on the surface of the porous tubular support, and is characterized in that the zeolite single crystals exposed on the surface of the zeolite membrane each have a growth axis almost perpendicular to the porous tubular support.

Preferably, grain boundary layers are formed in the spaces among a plurality of zeolite single crystals. The grain boundary layers are preferably 2 to 50 nm in thickness.

In either of the zeolite tubular separation membranes, it is preferable that 80% or more of the zeolite membrane is formed within 10 μm from the outer surface of the porous tubular support. When the porous tubular support is used to separate water from the mixture of water and alcohol, the separation factor α is preferably 1000 or more, and more preferably 10000 or more. As the porous tubular support, a porous ceramic tube is preferable.

Effects of the Invention

According to the process for manufacturing a zeolite membrane of the present invention, a porous tubular support is placed vertically in a reaction container containing a reaction solution and substantially apart from the inner surface of the reaction container and the reaction solution is heated while keeping the porous tubular support in the above described state; thus, the convection of the reaction solution is kept in a preferable state, which makes it possible to prepare a zeolite membrane with a high separation factor and permeation rate. The preparation apparatus of the present invention does not require a pressure container such as an autoclave, which enables the mass production of zeolite membranes inexpensively.

The zeolite tubular separation membrane of the present invention is a microporous membrane of uniform pore diameter, which has a zeolite membrane substantially only on the outer surface of the porous tubular support and the thickness of the zeolite membrane is small. Accordingly, when it is used for the separation of mixtures, the zeolite tubular separation membrane shows a small pressure loss and a high permeation rate. Further, since the zeolite tubular separation membrane is almost free from defects such as pinholes, it shows a high separation factor. Thus, it may be said that the zeolite tubular separation membrane of the present invention acts as a high-performance molecular sieve for separating various gas or liquid mixtures.

BEST MODE FOR CARRYING OUT THE INVENTION

Figure 1:
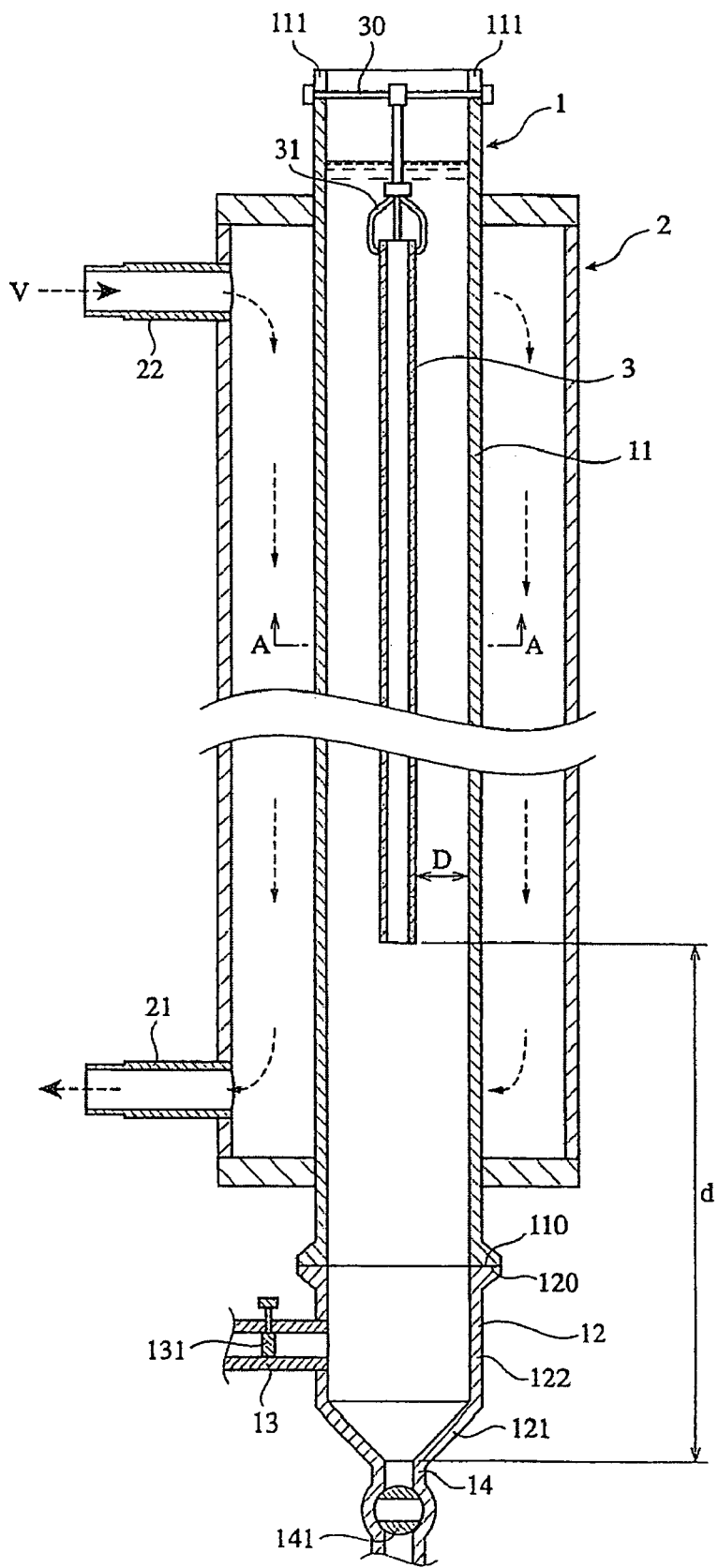
FIG. 1 is a sectional view of one embodiment of the apparatus for manufacturing zeolite membrane of the present invention.

[1] Process for Manufacturing a Zeolite Membrane (1) Reaction Solution

The reaction solution contains a silica source and an alumina source. It may also contain an alkaline metal source and/or an alkaline earth metal source depending on the situation. Examples of silica sources include: alkaline metal silicates such as sodium silicate, water glass and potassium silicate; silica powder; silicic acid; colloidal silica; and silicon alkoxides (e.g. aluminum isopropoxide). Examples of alumina sources include: aluminum salts such as aluminum hydroxide, sodium aluminate, aluminum sulfate, aluminum nitrate and aluminum chloride; aluminum powder; and colloidal aluminum. Examples of alkaline (earth) metal sources include: sodium chloride, potassium chloride, calcium chloride and magnesium chloride. Alkaline metal silicates serve both as a silica source and an alkaline metal source.

The molar ratio of silica source to alumina source (in terms of $SiO_2/Al_2O_3$) depends on the composition of the intended zeolite; however, it is generally 1 or more and preferably 2 or more.

The reaction solution may be a clear solution or a suspension such as slurry or colloidal solution. Herein, a reaction solution with a turbidity of 300 NTU or less is referred to as a clear solution, whereas a reaction solution with a turbidity more than 300 NTU is referred to as a suspension. The turbidity of the reaction solution depends on the concentration of the zeolite raw materials contained in the solution. As a clear solution, one with a turbidity of 200 NTU or less is preferable and one with a turbidity of 150 NTU or less is more preferable.

The content of the silica source plus alumina source in the reaction solution is not limited to any specific one; however, when the reaction solution is a clear solution, the content is preferably 5 to 50% by weight and more preferably 10 to 40% by weight. When the content of the silica source plus alumina source in the reaction solution is less than 5% by weight, the zeolite synthetic reaction is slowed too much. When the reaction solution is a suspension, the content is preferably more than 50% by weight and not more than 99.5% by weight and more preferably 60 to 90% by weight. When the content is more than 99.5% by weight, a uniform zeolite membrane is hard to form.

(2) Porous Tubular Support

The porous tubular support is preferably made of a ceramic, organic polymer or metal, and more preferably made of ceramic. As a ceramic, mulite, alumina, silica, titania or zirconia is preferably used. As a metal, stainless steel, sintered nickel or a sintered mixture of nickel and iron is preferably used.

When the zeolite tubular separation membrane composed of a porous tubular support and a zeolite membrane formed thereon is used as a molecular sieve, it is preferable that the pore diameter and porosity of the porous tubular support is set so as to satisfy the following requirements: (a) the tubular support can support a zeolite membrane firmly; (b) the tubular support has the smallest possible pressure loss; and (c) the tubular support has a self-supporting property (mechanical strength). Concretely, the average pore diameter of the porous tubular support is preferably 0.1 to 20 μm and more preferably 0.1 to 5 μm. The porosity is preferably 5 to 50% and more preferably 30 to 50%.

The porous tubular support can be of any size; however, it is practically about 2 to 200 cm in length, 0.5 to 2 cm in inside diameter and about 0.5 to 4 mm in thickness.

(3) Deposition of Seed Crystals

In advance of the hydrothermal synthesis, it is preferable to attach seed crystals to the porous tubular support. As the seed crystals, zeolite crystallites may be used. The average grain size of the seed crystals is preferably 1 nm to 1 μm, and more preferably 1 nm to 0.4 μm.

Crystallites of zeolite are put into water and stirred to prepare slurry. The concentration of seed crystals in the slurry is preferably 0.1 to 20% by weight, and more preferably 0.1 to 10% by weight. When the concentration is less than 0.1% by weight, the seed crystals are not uniformly attached on the porous tubular support, which is more likely to cause defects such as pinholes in the zeolite membrane, and therefore, not preferable. When the concentration is more than 20% by weight, the layer containing seed crystals becomes too thick. When the layer containing seed crystals is too thick, the seed crystals belonging to around the outer periphery of the layer do grow, but the seed crystals in the inner part of the layer do not grow very much and are held in the porous tubular support in the as ungrown condition, which is likely to cause exfoliation of or defects in the zeolite membrane.

A method of attaching the seed-crystal containing slurry to the porous tubular support can be appropriately selected from among dip coating, spray coating, other coating methods and filtration methods, depending on the shape of the porous tubular support. The time for which the porous tubular support is in contact with the slurry is preferably 0.5 to 60 minutes, and more preferably 1 to 10 minutes. When intending to form a zeolite membrane on the outer surface of the porous tubular support alone, it is preferable that the seed crystals are attached on the outer periphery of the porous tubular support alone.

After attaching the seed crystals, preferably the porous tubular support is dried. However, drying at a high temperature is not preferable, because the solvent rapidly evaporates at such a high temperature, thereby the agglomeration of seed crystal grains is increased, which might destroy the uniform adhesion of the seed crystals. Thus, preferably drying is performed at 70° C. or lower. When heat-drying is employed, in order to shorten the heating time, preferably the heat-drying is combined with drying at room temperature. The drying time is not particularly limited, as long as the porous tubular support can be fully dried; however, it is usually about 2 to 12 hours.

(4) Hydrothermal Synthesis Method

The porous tubular support is placed vertically in a reaction container and substantially apart from the inner surface of the reaction container. Methods for placing the porous tubular support in a reaction container include: for example, (a) a method in which the porous tubular support is suspended with a holding member located at the top of the reaction container; and (b) a method in which the porous tubular support is placed on a holding member provided on the bottom of in the reaction container. The holding member needs to have such a structure that does not substantially block the bottom opening of the porous tubular support. The order in which the reaction solution and the porous tubular support are added into the reaction container is not limited. It may be such that first the reaction solution is added into the reaction container and then the porous tubular support is immersed in the solution, or first the porous tubular support is suspended in the reaction container and then the reaction solution is added into the reaction container.

(i) Immersion of Porous Tubular Support in Reaction Solution

Hydrothermal synthesis is performed in such a condition that the porous tubular support is immersed in the reaction solution. For example, the porous tubular support 3 is immersed in the reaction solution while being suspended in the reaction container 1, as shown in FIG. 1. The porous tubular support 3 is placed substantially apart from the reaction container 1. Preferably, the porous tubular support 3 is placed in the reaction container 1 in such a manner that its axis is almost on the axis of the reaction container 1. Since both ends of the porous tubular support 3 are kept open, the reaction solution can enter the inside of the porous tubular support 3. Preferably, only one porous tubular support 3 is placed in each reaction container 1. When the reaction container 1 contains two or more porous tubular support 3, desirable convection may not be caused in the reaction solution when heating the reaction solution, whereby a homogenous zeolite membrane may not be formed.

Preferably, the porous tubular support 3 is immersed in the reaction solution so that its top is 2 to 30 cm below the solution level. When the distance from the top of the porous tubular support 3 to the solution level is less than 2 cm, the convection may not be sufficiently caused in the reaction solution, whereby a homogeneous zeolite membrane may not be formed. When the distance from the top of the porous tubular support 3 to the solution level is more than 30 cm, the amount of the reaction solution to be heated is too large, resulting in too much energy loss.

(ii) Heating of Reaction Solution

The reaction solution is heated while keeping both ends of the porous tubular support open. When both ends of the porous tubular support are kept open, the reaction solution flows even inside the porous tubular support, which makes it easy to keep the temperature of the reaction solution uniform. Preferably, a heating device is provided in such a manner as to surround the porous tubular support. Examples of preferred heating devices include: a jacket provided on the periphery of the reaction container; and a spiral tube provided in the inside the reaction container. The reaction solution can be heated by feeding a heating medium such as steam to the jacket or the spiral tube. Preferably, the reaction solution is heated so that convection is caused over the full length of the porous tubular support. Occurrence of such convection in the reaction solution enables the uniform formation of a zeolite membrane on the surface of the porous tubular support.

The temperature of the reaction solution before heating is preferably lower than 35° C. When the temperature is 35° C. or higher, zeolite crystals are likely to be formed in the reaction solution. When the zeolite crystals are deposited on the porous tubular support during hydrothermal reaction, defects are likely to occur in the zeolite membrane unfavorably. Preferably, the reaction solution in the reaction container is heated at a heating rate in the range of 5 to 100° C./min. When the heating rate is lower than 5° C./min, it takes too long a time to heat the reaction solution, and spontaneous nucleation occurs in the reaction solution before zeolite crystals begin to grow on the porous tubular support. When the zeolite nuclei having been spontaneously formed in the reaction solution are deposited on the porous tubular support, a homogeneous and dense zeolite membrane is not formed. Thus, taking too much time for heating is unfavorable. When the heating rate is more than 100° C./min, the heating temperature is hard to control.

The reaction solution may be a clear solution or a suspension. However, preferred heating temperature is different between a clear solution and a suspension. When a clear solution is used, it is preferable to adjust the heating temperature lower than the boiling temperature Tb of the clear solution and not lower than Tb−50° C. (the temperature 50° C. lower than the boiling temperature Tb). When the heating temperature is lower than Tb−50° C., the reaction may take too much time, and moreover, zeolite synthetic reaction may not occur sufficiently. When the temperature of the reaction solution is higher than Tb, a homogenous zeolite membrane may be not formed.

When a suspension is used as the reaction solution, preferably the suspension is boiled, and more preferably it is kept at a round the boiling temperature. When the suspension is not boiled, a homogenous zeolite membrane may be hard to form.

The heating time can be changed depending on the heating temperature; however, it is generally 1 to 100 hours.

(iii) Formation of Zeolite Membrane

The zeolite synthetic reaction is allowed to progress by heating the reaction solution, and a zeolite membrane is formed on the surface of the porous tubular support. The thickness of the zeolite membrane formed can be appropriately adjusted by controlling the heating time or heating temperature. For example, keeping a clear solution at 80° C. for 2 hours makes possible the production of a zeolite membrane about 1 to 20 μm in average thickness.

The zeolite membrane is deposited on the surface of the porous tubular support and almost no zeolite membrane is formed in the inside of the pores. Thus, a zeolite membrane with uniform thickness and very few defects can be obtained. This is probably because the hydrothermal synthesis is performed while keeping the inside of the porous tubular support filled with the reaction solution, there is almost no pressure difference between the inside and the outside of the porous tubular support, and thus, the reaction solution hardly enters the pores of the porous tubular support.

The zeolite membrane is formed on the outer surface of the porous tubular support. Substantially no zeolite membrane is formed on the inner surface of the porous tubular support, and besides almost no gelatinous substance such as silica etc. is deposited thereon. This is probably because the flow of the reaction solution due to convection is small in the inside of the porous tubular support and the temperature of the inside of the porous tubular support is low due to the existence of temperature gradient in the reaction solution.

In the process for manufacturing zeolite membranes of the present invention, the porous tubular support is placed in the reaction container in such a manner as to be substantially apart from the inner surface of the reaction container, whereby the convection of the reaction solution between the porous tubular support and the reaction container is in a desirable state. Such circumstances are suitable for the growth of zeolite crystals. Further, in preferred embodiments of the present invention, since the heating rate during the hydrothermal synthesis is sufficiently high, the growth reaction of the zeolite crystals occurs before spontaneous nucleation begins in the reaction solution. Thus, the zeolite crystals can grow, while maintaining the framework structure and crystal orientation of the seed crystals carried on the porous tubular support, to form a zeolite membrane. The structure of the zeolite membrane obtained such crystal growth will be described in more detail later.

[2] Apparatus for Manufacturing Zeolite Membrane (1) First Embodiment

FIG. 1 shows one embodiment of apparatuses for manufacturing zeolite membranes of the present invention. The apparatus includes: a reaction container 1 that can accommodate a porous tubular support 3 vertically; and a jacket 2 provided on the periphery of the reaction container 1. The reaction container 1 includes a cylindrical main body 11 and a lower part 12 attached to the bottom of the main body 11. The bottom 110 of the main body 11 and the top 120 of the lower part 12 are welded to each other.

On the top of the main body 11 provided are a pair of notches 111, 111. The notches 111, 111 are designed to allow a holding bar 30 for holding the porous tubular support 3 to be fitted therein. To the mid section of the holding bar 30 a clamp 31 for gripping the porous tubular support 3 is attached. The porous tubular support 3 is suspended in the reaction container 1 by fitting the holding bar 30 in the notches 111, 111 while allowing the clamp 31 to grip the porous tubular support 3.

The lower part 12 is made up of a conical portion 121 corresponding to the bottom of the reaction container 1 and a cylindrical portion 122 that extends from the conical portion 121. From the cylindrical portion 122 an inlet 13 for a reaction solution is protruded. From the conical portion 121 an outlet 14 is protruded. The inlet 13 and the outlet 14 are provided with a cock 131 and a cock 141, respectively. In the embodiment shown in FIG. 1, the outlet 14 is provided on the bottom of the conical portion 121 of the lower part 12 so that a reaction solution is easily discharged.

The jacket 2 is provided in such a manner as to cover almost all the part of the periphery of the main body 11. From the jacket 2, an upper opening 22 as an opening for feeding water vapor V and a lower opening 21 as an opening for expelling water vapor V are protruded. The water vapor V having flowed in from the upper opening 22 passes through the inside of the jacket 2 and is expelled from the lower opening 21.

Figure 7:
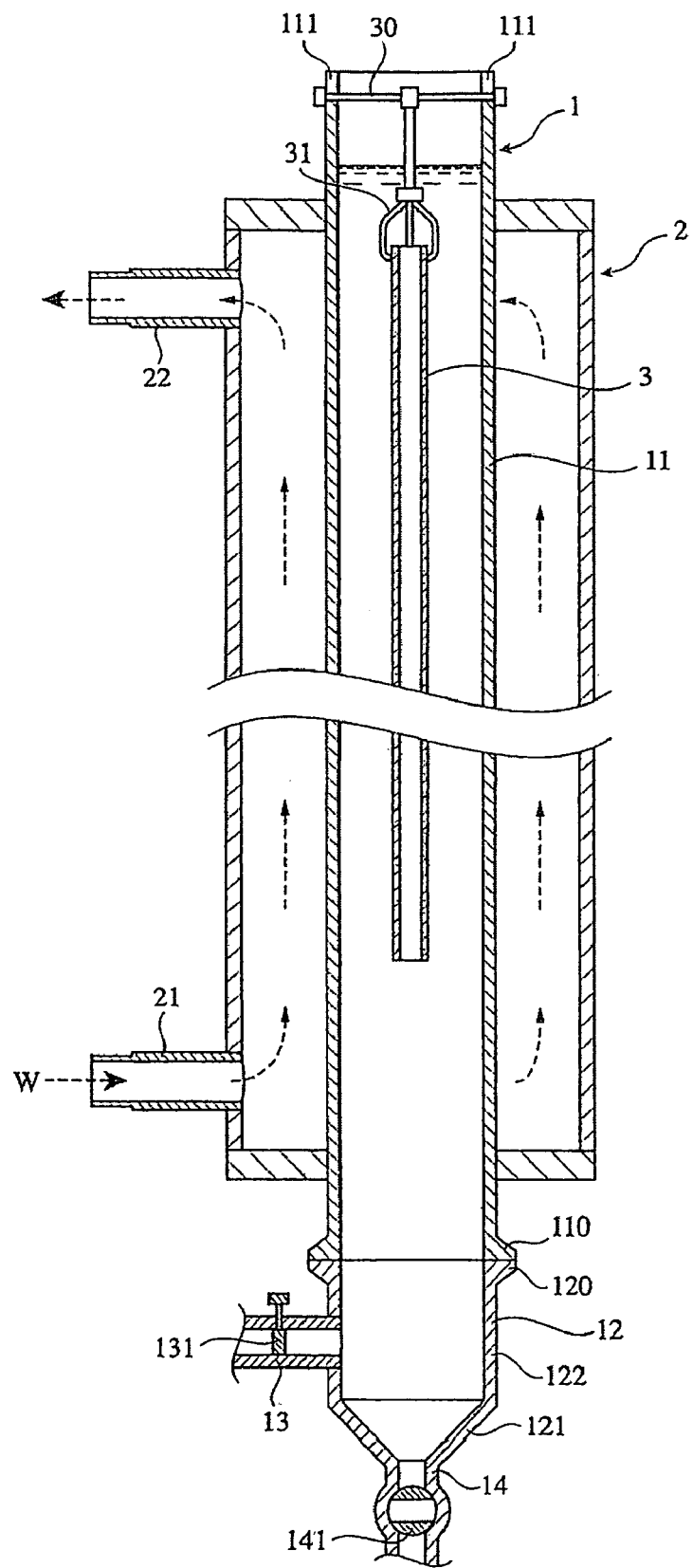
FIG. 7 is a sectional view showing the flow of hot water where hot water is used as a heating medium supplied to a jacket.

When hot water W is used as a heating medium to be fed to the jacket 2, it is preferable to feed the hot water W from the lower opening 21 to the jacket 2 and expel the same from the upper opening 22, as shown in FIG. 7.

A reaction solution is injected into the reaction container 1 from the inlet 13 for a reaction solution to fill the reaction container 1. The porous tubular support 3 is immersed in the reaction solution with its one end grippes with the clamp 31. The lower end of the porous tubular support is in a position apart from the conical portion 121 (bottom) of the reaction container. When hydrothermal synthesis is performed while allowing the lower end of the porous tubular support 3 to be in contact with the conical portion 121, sediment of fine zeolite formed in and settled from the reaction solution are attached around the lower end of the porous tubular support 3, which makes it easy to cause defects in the zeolite membrane, and therefore being undesirable. The preferable distance d from the lower end of the porous tubular support 3 to the conical portion 121 depends on the length of the porous tubular support 3. Preferably, the distance d is increased with the increase in the length of the porous tubular support 3. For example, when the porous tubular support is 80 cm in length, the distance d is about 5 to 60 cm.

Figure 2:
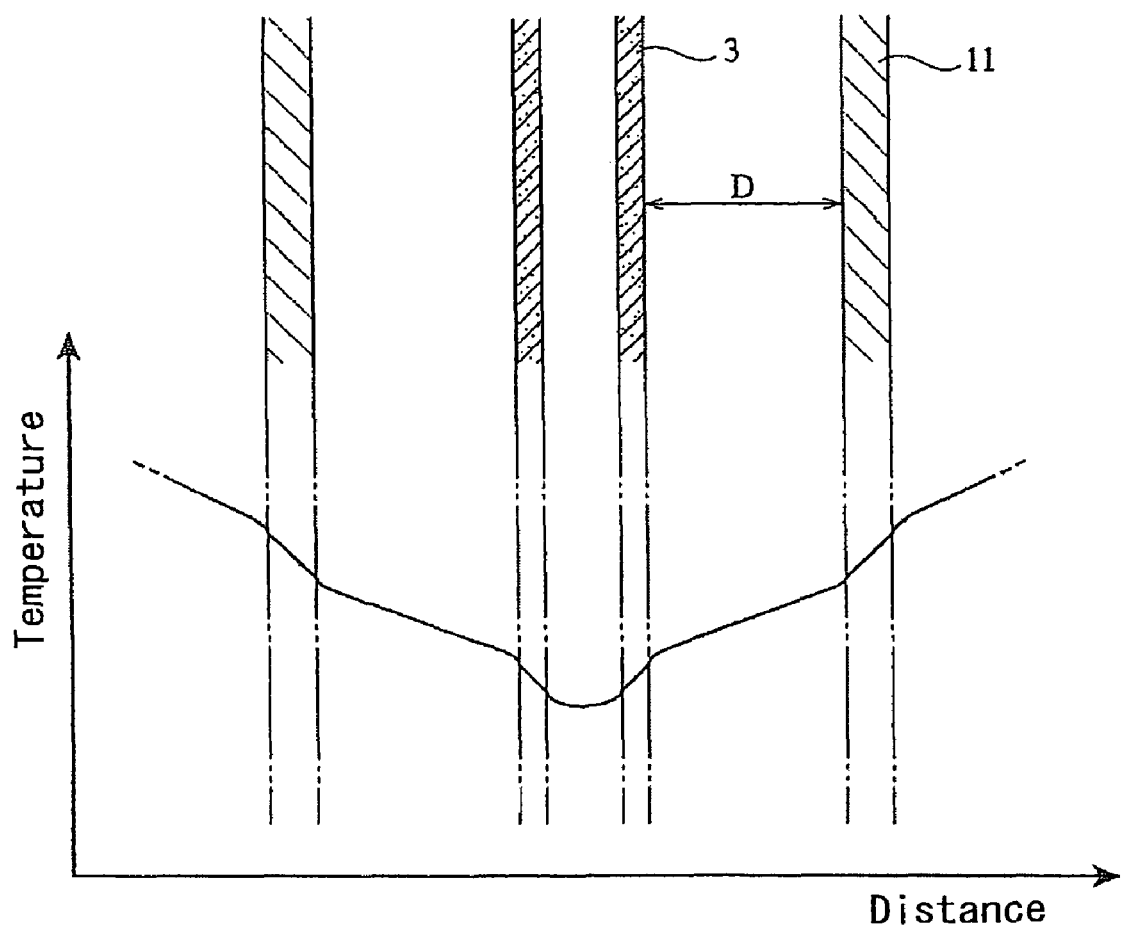
FIG. 2 is a graph schematically showing the temperature gradient at the section along the line A-A of FIG. 1.

FIG. 2 schematically shows the temperature gradient at the section along the line A-A of FIG. 1. When water vapor V is fed from the upper opening 22 of the jacket 2, the jacket 2 is filled with the water vapor V and the heat of the water vapor V is conducted to the main body 11 of the reaction container 1. The heat having been conducted to the main body 11 is then conducted to the reaction solution outside the porous tubular support 3; however, the temperature of the reaction solution is lower than that of the inside of the jacket 2 due to heat loss. To the reaction solution inside the porous tubular support 3, heat is conducted from the reaction solution outside the porous tubular support via the porous tubular support 3. Thus, the temperature inside the porous tubular support 3 is the lowest.

Figure 3:
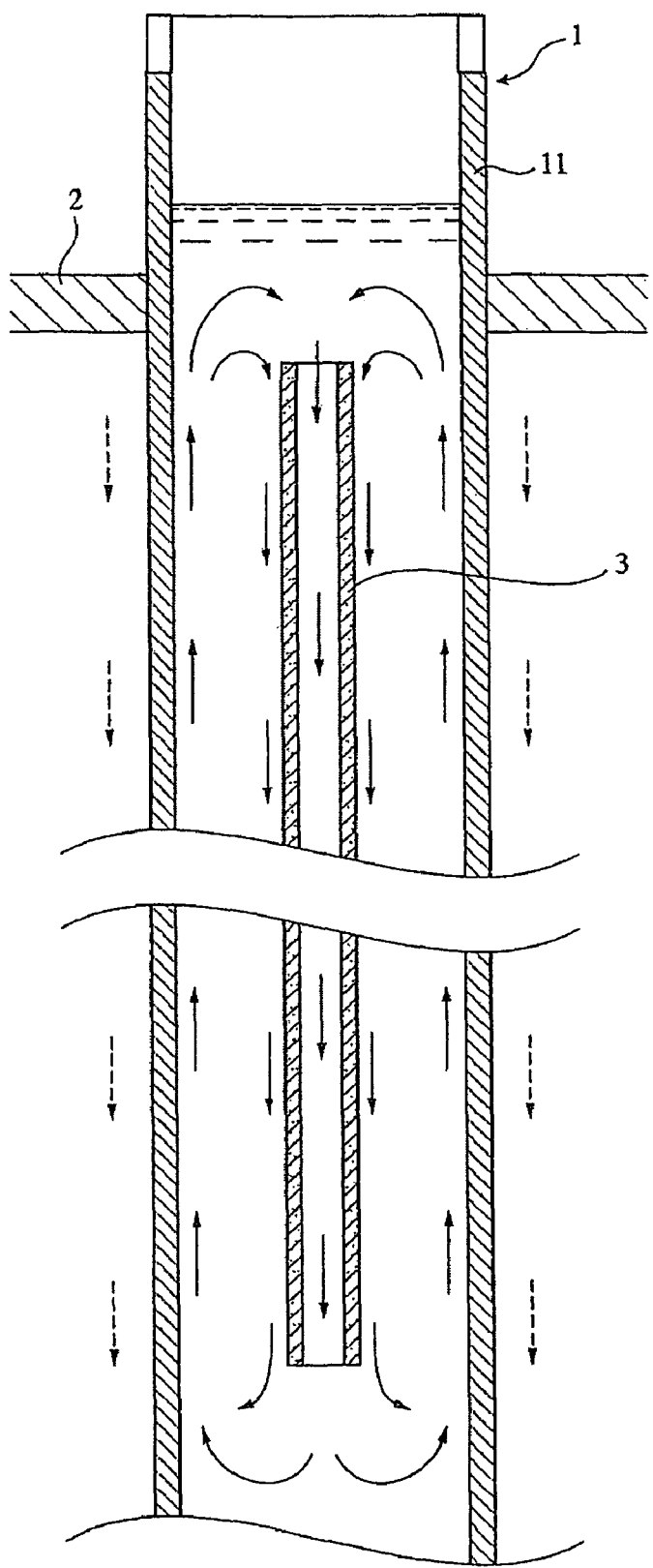
FIG. 3 is a sectional view showing the convection of a reaction solution.

FIG. 3 schematically shows the convection occurring in a reaction solution. For simplifying the drawing, the clamp 31 by which the porous tubular support 3 is suspended is omitted. As described above, temperature gradient occurs in the reaction solution, whereby convection is caused in the reaction solution. The reaction solution heated by the heating medium in the jacket moves upward along the inner surface of the main body 11 of the reaction container 1. When the reaction solution having moved upward in the main body 11 comes in contact with the porous tubular support 3, the reaction solution is cooled by the porous tubular support 3 whose temperature is relatively low, and it moves downward along the porous tubular support 3.

To cause desirable convection in the reaction solution, preferably the distance D from the inner surface of the reaction container 1 to the outer surface of the porous tubular support 3 is set to be 2 to 25 mm. When the distance D from the inner surface of the reaction container 1 to the outer surface of the porous tubular support 3 is less than 2 mm, convention is not fully developed, whereby the synthetic raw materials for zeolite are not sufficiently fed to the surface of the porous tubular support 3. When the distance D is more than 15-25 mm, the temperature responsivity of the reaction solution is too low, which makes difficult the temperature control of the reaction solution.

Preferably, the height of the reaction container 1 is larger than the length of the porous tubular support 3 by 4 to 90 cm. When the difference between the height of the reaction container 1 and the length of the porous tubular support 3 is less than 4 cm, desirable convection is hard to cause in the reaction solution even if the porous tubular support 3 is fully immersed in the reaction solution. When the height of the reaction container 1 is larger than the length of the porous tubular support 3 by more than 90 cm, that much more effect cannot be produced, and it is useless to do so.

Occurrence of convention in the reaction solution makes it possible not only to keep the temperature of the reaction solution uniform, but to feed the raw materials for zeolite to the surface of the porous tubular support 3. Thus, a uniform zeolite membrane is formed on the surface of the porous tubular support 3.

Since one end of the porous tubular support 3 is gripped with a clamp, a zeolite membrane is not formed on the gripped portion. However, it will not be an obstacle even when a zeolite tubular separation membrane made up of the porous tubular support 3 and the zeolite membrane formed thereon is used as a molecular sieve. The reason is that when such a zeolite tubular separation film is used as a molecular sieve, each of the end portions of the tubular separation membrane is provided with a member for sealing the inside of the tube and a member for supporting the tube, and therefore, the end portions do not function as a separation membrane.

(2) Second Embodiment

Figure 4:
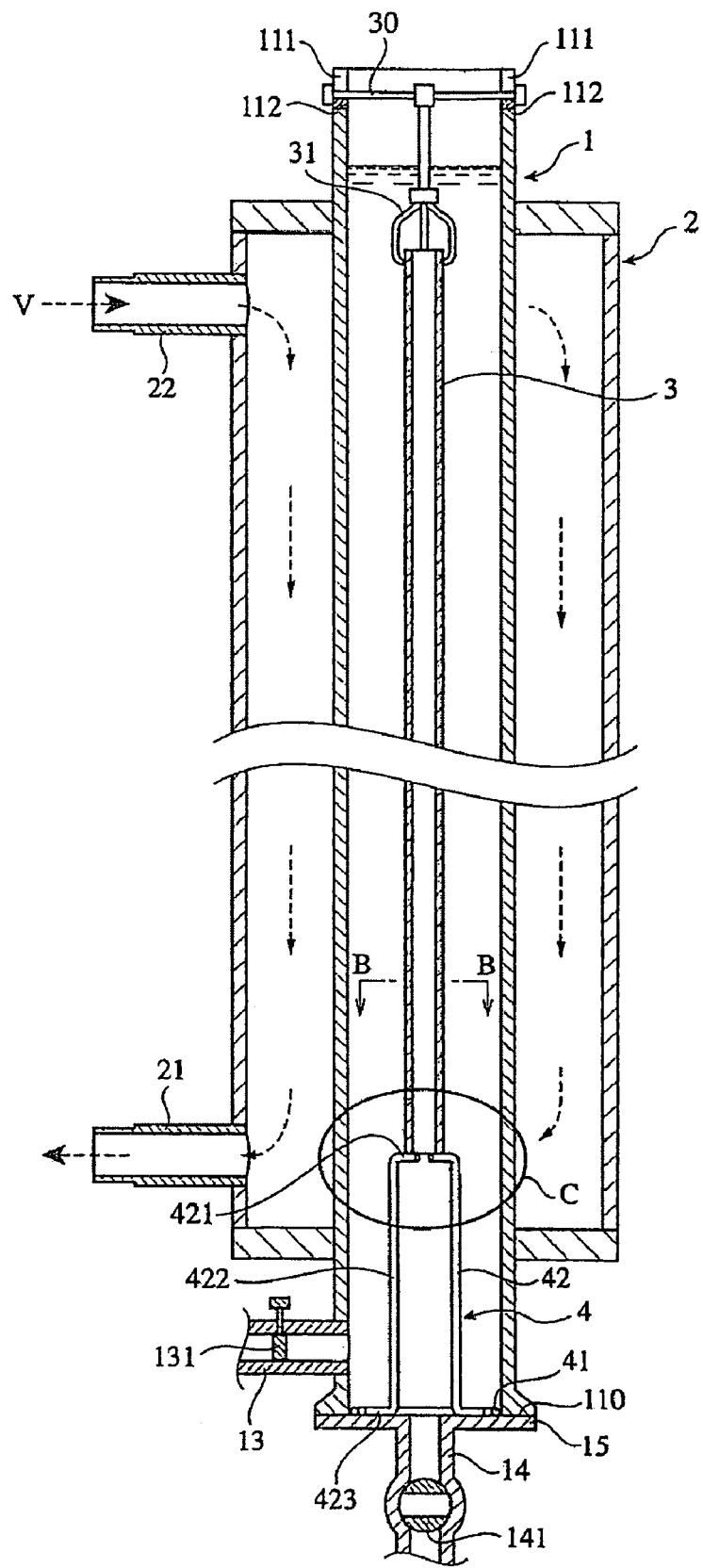
FIG. 4 is a sectional view of another embodiment of the apparatus for manufacturing zeolite membrane of the present invention.

FIG. 4 shows another embodiment of the apparatuses for manufacturing zeolite membranes of the present invention. The preparation apparatus shown in FIG. 4 is almost the same as that of the first embodiment, provided that it includes a holding member 4 on which the porous tubular support 3 is placed; thus, the different points alone will be described below. The reaction container 1 includes: a cylindrical main body 11; and an inlet 13 for a reaction solution which is protruded from the main body 11. The bottom 110 of the main body 11 is welded to a disc-shaped base 15. From the base 15, an outlet 14 for the reaction solution is protruded downward.

Figure 5:
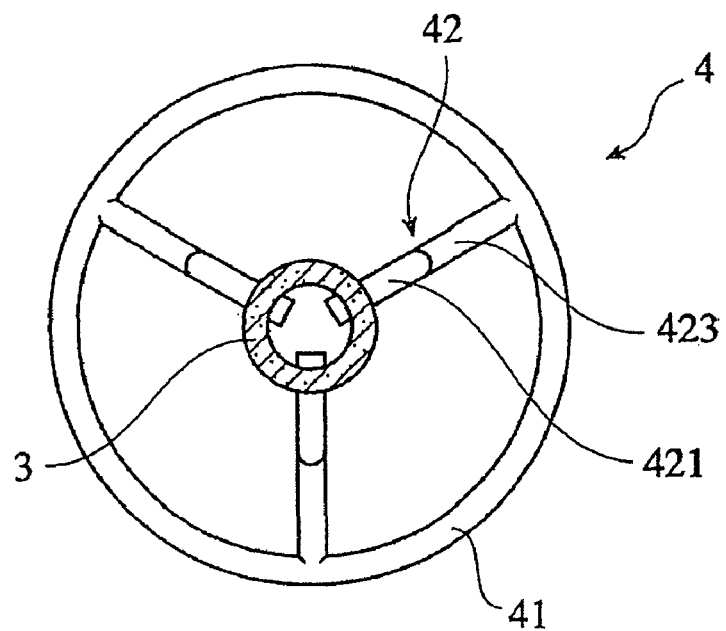
FIG. 5 is an enlarged sectional view along the line B-B of FIG. 4 which shows a porous tubular support and a member supporting the bottom of the tubular support.
Figure 6:
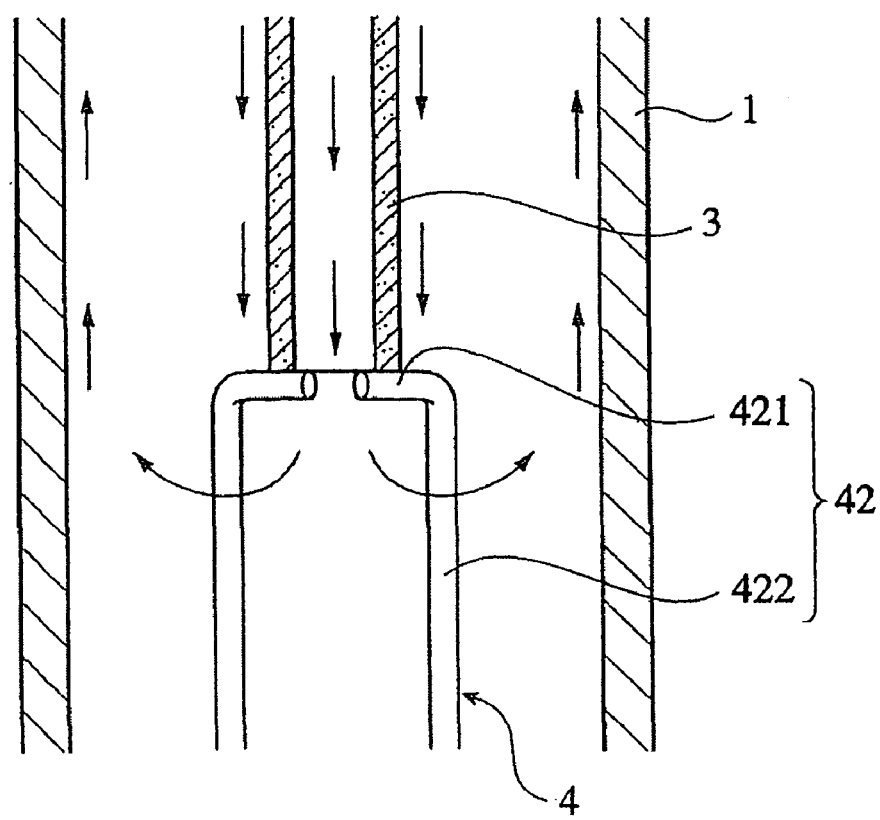
FIG. 6 is an enlarged sectional view of the C portion of FIG. 4 which shows the convection of a reaction solution at the bottom of the porous tubular support.

As shown in FIGS. 4 and 5, the holding member 4 is in the form of a trivet and is made up of: a ring-shaped pedestal 41; and 3 legs 42 in the form of a crank attached to the inside of the pedestal 41 at uniform intervals. The outside diameter of the pedestal 41 is slightly smaller than the inside diameter of the main body 11 of the reaction container 1. Each leg 42 includes: a horizontal portion 421 on which the porous tubular support 3 is placed; a vertical portion 422 which is connected to the outer end of the horizontal portion 421; and a joining portion 423 which is horizontal and connected to the bottom of the vertical portion 422. As shown in FIG. 5, the tips of the horizontal portions 421 are not in contact with each other so that the bottom opening of the porous tubular support 3 is not blocked even when the porous tubular support 3 is placed on them. The holding member 4 is placed on the base 15 of the reaction container 1.

The porous tubular support 3 is put into the reaction container 1 with its one end gripped with the clamp 31, and the holding bar 30 is fitted in the notches 111, 111. When the other end of the porous tubular support 3 comes in contact with the horizontal portions 421 of the legs 42, the holding bar 30 also comes in contact with the bottoms of the notches 111, 111. Since packing member 112, 112 are attached to the respective bottoms of the notches 111, 111; the dimensional error of the porous tubular support 3 can be absorbed.

When the reaction solution is heated by feeding water vapor to the inside of the jacket 2, convection occurs in the reaction solution. Since the legs 42 do not block the bottom opening of the porous tubular support 3, the flow of the reaction solution in the inside of the porous tubular support 3 is not inhibited. Further, the legs 42 are thin enough not to affect the convection under the porous tubular support 3.

Thus, the convection in the reaction solution is in a desirable state, which enables the formation of a uniform zeolite membrane on the outer surface of the porous tubular support 3.

[3] Zeolite Tubular Separation Membrane

The zeolite tubular separation membrane of the present invention includes: a porous tubular support with both ends open; and a zeolite membrane formed on the surface of the porous tubular support. In the zeolite tubular separation membrane, preferably, (a) 80% or more of the zeolite membrane is formed within 0.1 to 20 μm from the outer surface of the porous tubular support and (b) substantially no zeolite membrane is formed on the inner surface of the porous tubular support. When the zeolite membrane is formed outside the range of 20 μm from the outer surface of the porous tubular support or it is formed even on the inner surface of the porous tubular support, pressure loss may become too large. Preferably 80% or more of the zeolite membrane is formed within 10 μm from the outer surface of the porous tubular support and more preferably within 5 μm from the outer surface of the porous tubular support.

When the zeolite tubular separation membrane is used to separate water from the mixture of water and alcohol, the separation factor α is preferably 1000 or more and more preferably 10000 or more. The term "separation factor" herein used means, for example, in the separation of water from the mixture of water and ethanol, the factor expressed by the following equation (1), $$\alpha = (B_1/B_2)/(A_1/A_2) \quad (1)$$

wherein $A_1$ represents the concentration % by weight of water before separation, $A_2$ the concentration % by weight of ethanol, $B_1$ the concentration % by weight of water in the liquid or gas having permeated through the membrane, and $B_2$ the concentration % by weight of ethanol. Since the separation factor α is proportional to the thickness of the zeolite membrane, a zeolite tubular separation membrane with a large separation factor α can be prepared by forming a zeolite membrane with large thickness.

Figure 8:
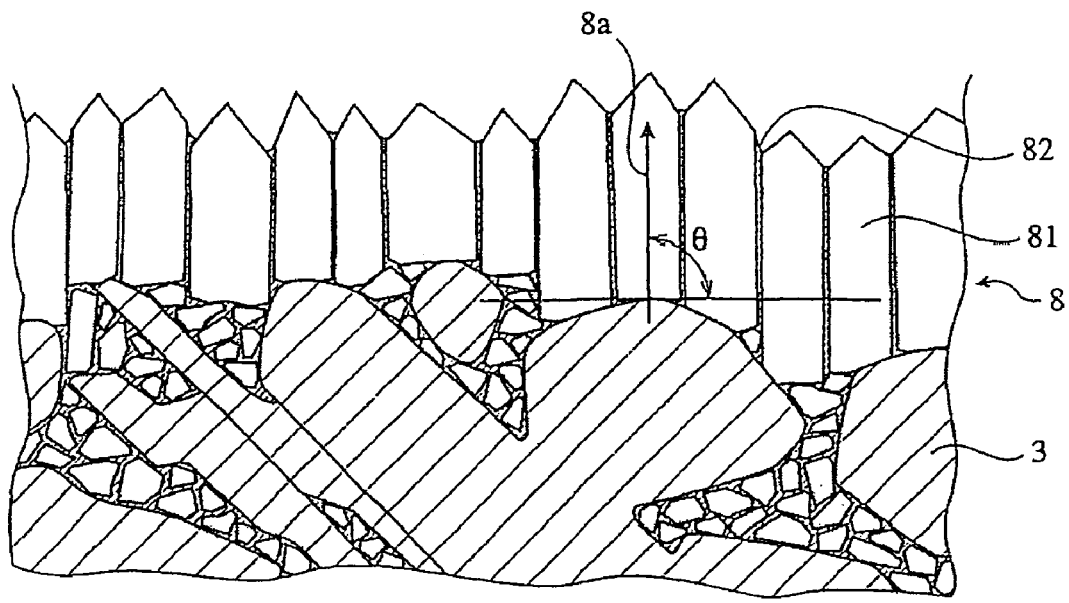
FIG. 8 is a schematic view showing one example of the zeolite tubular separation membrane of the present invention.

FIG. 8 schematically shows the zeolite tubular separation membrane of the present invention. The zeolite membrane 8 is constituted with: a plurality of zeolite single crystals 81 formed almost perpendicularly to the porous tubular support 3; and grain boundary layers 82 formed in the spaces among zeolite single crystals 81. The term "almost perpendicularly to the porous tubular support 3" herein used means that the angle θ between the growth axis 8a of the zeolite single crystal 81 and the axis of or the surface of the porous tubular support 3 is 80 to 90°.

The mechanism of the formation of the zeolite membrane 8 having such a structure is probably as follows. In the preparation method of the present invention, zeolite seed crystals are supported on the porous tubular support 3 in arbitrary directions relative to the porous tubular support 3 and begin growing in the directions of the respective growth axis not in contact with the porous tubular support 3. Thus, the seed crystals begin growing in arbitrary directions.

As crystal growth proceeds, the collision between crystals occurs. The crystals that grow perpendicularly to the outer surface 3a of the porous tubular support 3 has the highest growth rate, and therefore, the crystals that grow in the directions a little deviating from the direction perpendicular to the porous tubular support are forced to grow with its growth direction restricted by the crystals having grown perpendicularly to the porous tubular support. And the crystals that grow in the directions largely deviating from the direction perpendicular to the porous tubular support collide with the crystals having grown perpendicularly to porous tubular support and do not grow any more. Thus, there is no obstacle to the crystal growth perpendicular to the porous tubular support 3, but on the other hand, the crystal growth in the direction other than that perpendicular to the porous tubular support 3 is restricted or inhibited (geometrical selection). This leads to the occurrence of selection in crystal growth, allowing the zeolite crystals 81 to grow almost perpendicularly to the porous tubular support 3 as a whole.

Preferably, 90% or more of the zeolite single crystals 81 exposed on the surface of the zeolite membrane 8 have a growth axis 8a almost perpendicular to the porous tubular support 3. When geometrical selection fully functions during the crystal growth, 90% or more of the zeolite single crystals 81 exposed on the surface of the zeolite membrane 8 have a growth axis 8a almost perpendicular to the porous tubular support 3.

When crystals adjacent to those having grown perpendicularly to the porous tubular support continue to grow while colliding with them, the substances difficult for the zeolite crystals 81 to take in are concentrated on the crystal surface, resulting in the formation of grain boundary layers 82 between the zeolite crystals 81. The grain boundary layers 82 thus formed are made of oxides having a density larger than that of the zeolite crystals 81. Preferably, the thickness of the grain boundary layers 82 is about 5 to 50 nm. Preferably, pores larger in diameter than zeolite pores are not formed in the grain boundary layers 82. When pores with a large diameter are formed in the grain boundary layers 82, a good molecular sieve effect cannot be obtained. A zeolite membrane 8 including substantially dense grain boundary layers 82 exhibits a good molecular sieve effect.

As the porous tubular support 3, a porous ceramic tube is suitably used. Examples of preferred ceramics include: alumina, mulite, silica, titania and zirconia.

The zeolite tubular separation membrane 3 of the present invention is a microporous membrane having very few defects and uniform pore diameter, and besides, it undergoes only a small pressure loss because the zeolite membrane 8 is formed substantially only on the outer surface of the porous tubular support and has a good separation performance. The zeolite tubular separation membrane of the present invention, which has such a good separation performance, can be produced by the method for manufacturing a zeolite membrane of the present invention.

EXAMPLES

The present invention will be described in further detail by the following examples; however, it is to be understood that these examples are not intended to limit the present invention.

Example 1

Fine particles of A-type zeolite (average particle size 100 nm to 1 μm) were added into water and stirred to prepare a 0.5% by weight slurry. Then, a porous tubular support made of α-alumina (1.3 μm in average pore diameter, 10 mm in outside diameter, 6 mm in inside diameter, 10 cm in length) was immersed in the above slurry for 3 minutes and drawn up from the slurry at a specified rate. The porous tubular support drawn up form the slurry was dried in a thermostatic bath at 25° C. for 2 hours and then in a thermostatic bath at 70° C. for 16 hours. The section of the porous support after drying was observed with a scanning electron microscope, and the observation confirmed that the seed crystals were homogeneously adhered on the surface of the porous support.

Sodium silicate, aluminum hydroxide and distilled water were mixed so that the composition of A-type zeolite described in H. Robson, "Verified Synthesis of Zeolite Materials," Elsevier Science (2001) was obtained, and the obtained solution was to be used as a hydrothermal reaction solution. The turbidity of the reaction solution was higher than the maximum value (1000 NTU) of the turbidity meter. The porous support having been provided with a seed crystal layer was immersed in the reaction solution. The reaction solution was heated to 100° C. by feeding water vapor to the jacket and kept at the temperature for 4 hours. As a result, a zeolite membrane was formed on the outer surface of the porous support. The zeolite membrane was rinsed and dried at 36° C. for 16 hours.

Figure 9:
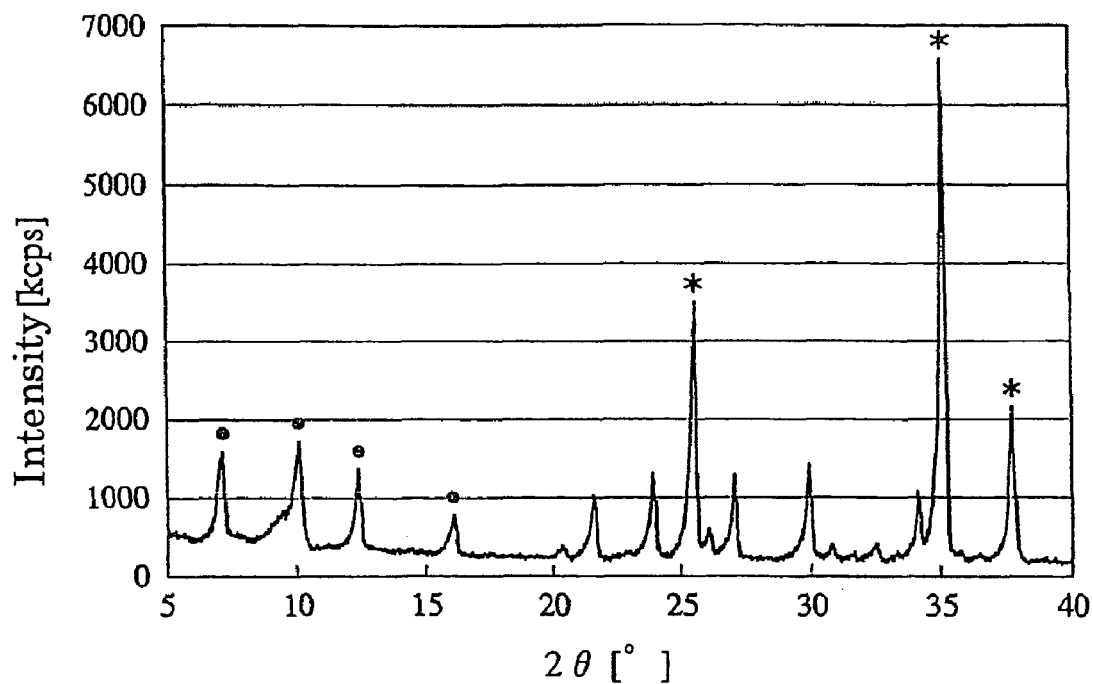
FIG. 9 is a chart showing the X-ray diffraction pattern of the zeolite tubular separation membrane of Example 1.
Figure 10:
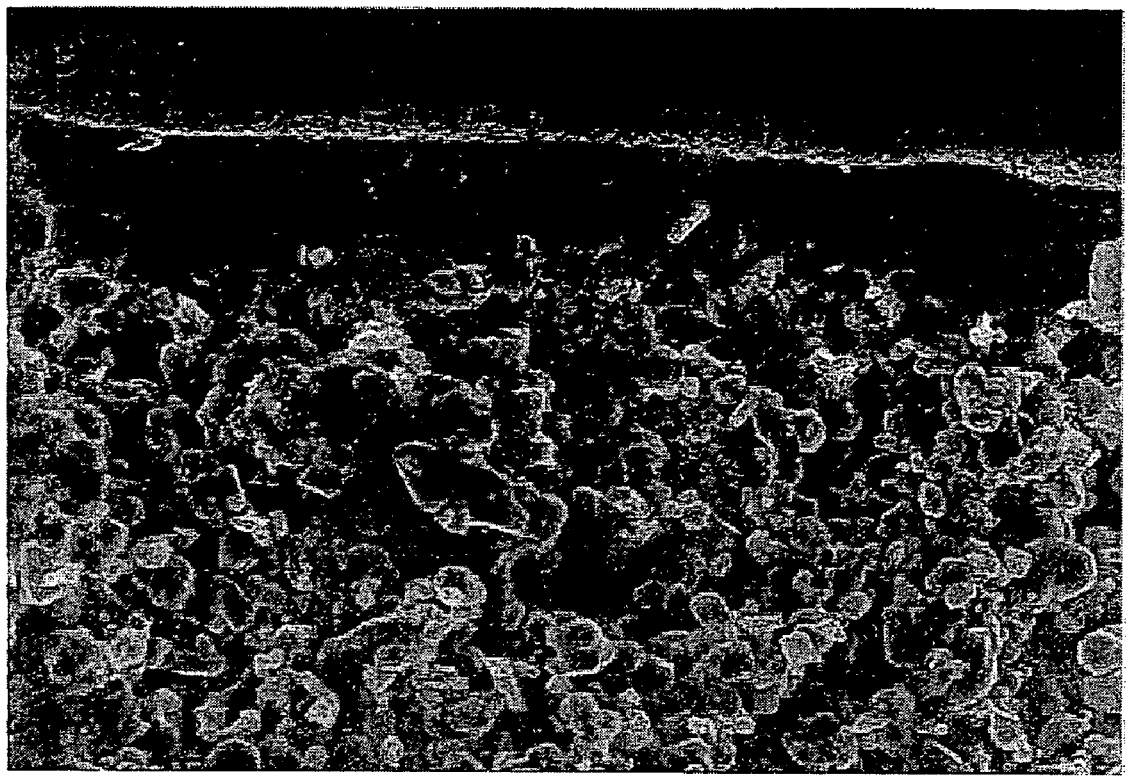
FIG. 10 is a scanning electron photomicrograph of a section of the zeolite tubular separation membrane of Example 1.
Figure 11:
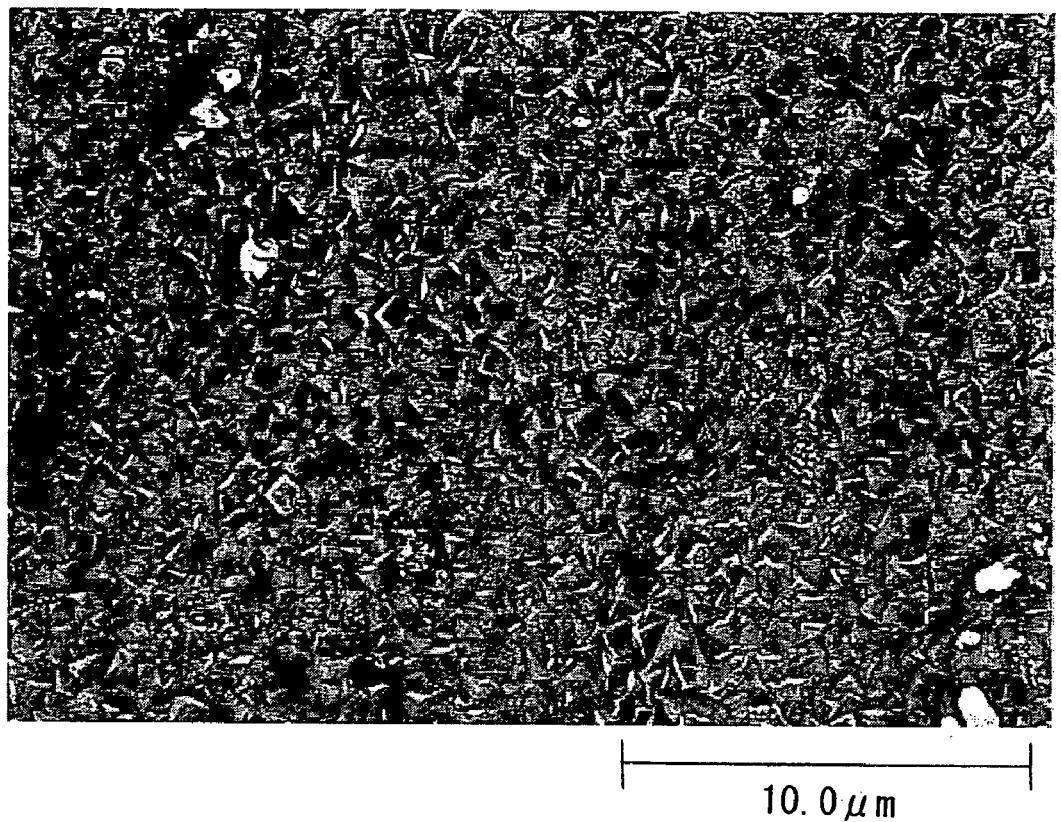
FIG. 11 is a scanning electron photomicrograph of the surface of the zeolite membrane of Example 1.

FIG. 9 shows the X-ray diffraction pattern of the zeolite membrane and FIGS. 10 and 11 show the scanning electron photomicrographs of a section and the surface of the zeolite membrane, respectively. As shown in FIG. 10, almost no zeolite membrane went into the pores of the porous tubular support, but the zeolite membrane was formed thin on the surface of the porous tubular support. FIGS. 9 to 11 confirmed that an A-type zeolite crystal layer with uniform thickness was formed.

Figure 12:
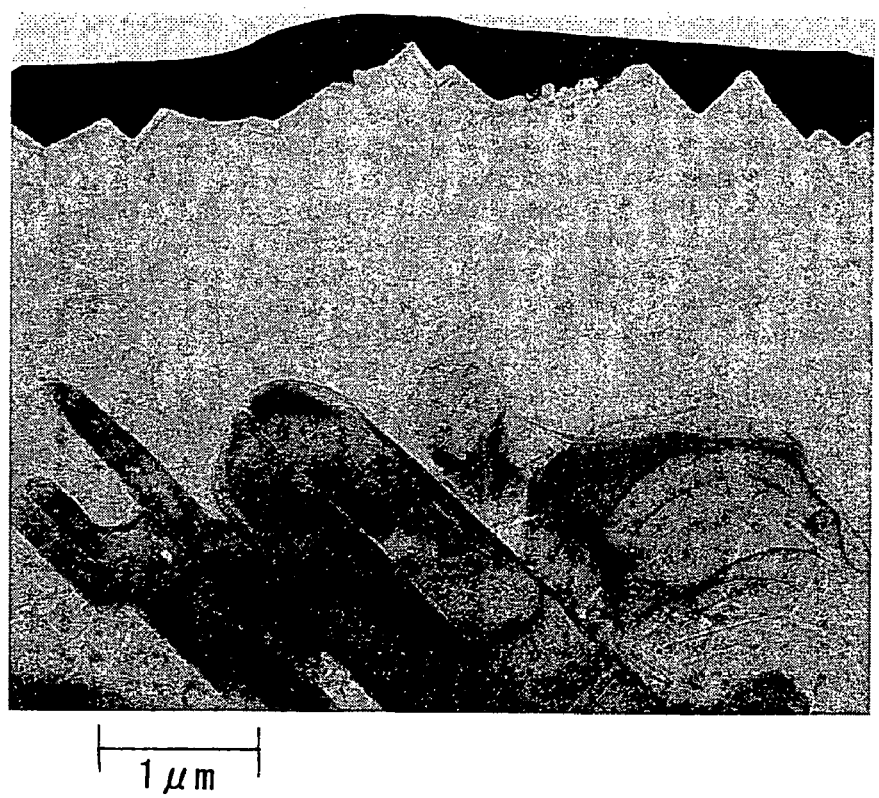
FIG. 12 is a transmission electron photomicrograph of a section of the zeolite tubular separation membrane of Example 1.
Figure 13:
FIG. 13 is another transmission electron photomicrograph of a cross section of the zeolite tubular separation membrane of Example 1.

Sections of the zeolite tubular separation membrane were observed with a transmission electron microscope. FIGS. 12 and 13 show the transmission electron photomicrographs (TEM photomicrographs). The zeolite crystals 81 were formed almost perpendicularly to the surface 3a of the porous tubular support and in the spaces among the zeolite crystals 81 grain boundary layers 82 were formed. The portion corresponding to the grain boundary layers 82 in the TEM photomicrographs seems darker than the portion corresponding to the zeolite crystals 81. This confirmed that the grain boundary layers 82 had a density higher than that of the zeolite crystals 81.

Figure 14:
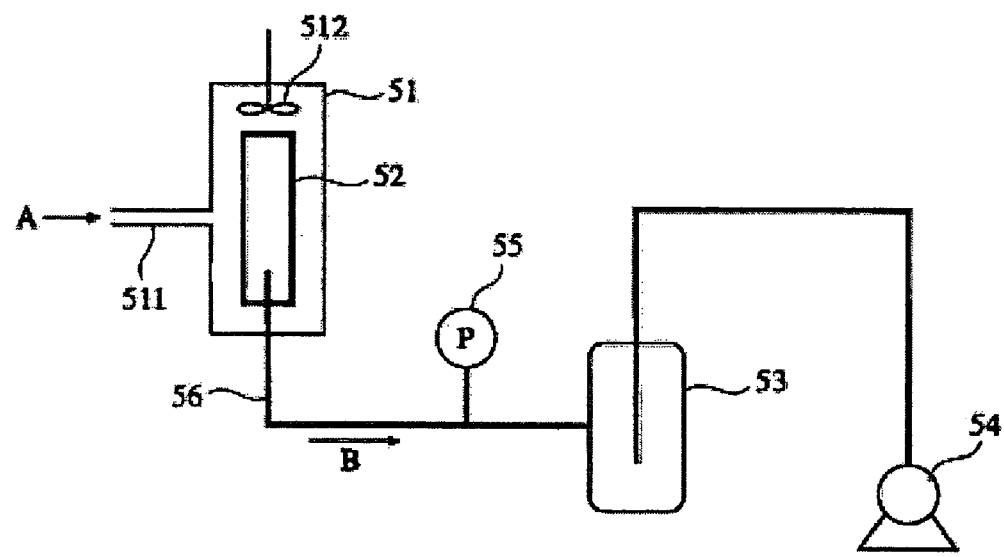
FIG. 14 is a schematic view of the pervaporation (PV) testing apparatus used in each example.

A pervaporation (PV) testing apparatus as shown in FIG. 14 was assembled so as to evaluate the obtained zeolite membrane for separation performance. The PV testing apparatus included: a container 51 provided with a pipe 511 through which a feed liquid A is fed and a stirrer 512; a separation membrane 52 installed in the inside of the container 51; a pipe 56 connected to the open end of the separation membrane 52; and a pump 54 connected to the end of the pipe 56 via a liquid nitrogen trap 53. The separation membrane 52 was made up of a porous support and a zeolite membrane formed on the surface of the porous support, just like the above described one. The pipe 56 was equipped with a vacuum gauge 55 at some midpoint thereof.

A feed liquid A (the mass ratio of ethanol/water=90/10) at 75° C. was fed to the container 51 of the PV testing apparatus through the pipe 511 and suction was applied to the inside of the separation membrane 52 with the vacuum pump 54 (the vacuum degree by the vacuum gauge 55: 10 to 1000 Pa). The liquid B having permeated the separation membrane 52 was trapped with the liquid nitrogen trap 53. The compositions of the feed liquid A and the liquid B having permeated were measured by a gas chromatograph (GC-14B by Shimadzu Corporation), and the separation factor α was determined. The result thus determined is shown in Table 1. The amount of the liquid having permeated through the separation membrane 52 was 4 kg/m$^2$·hr.

Example 2

Figure 15:
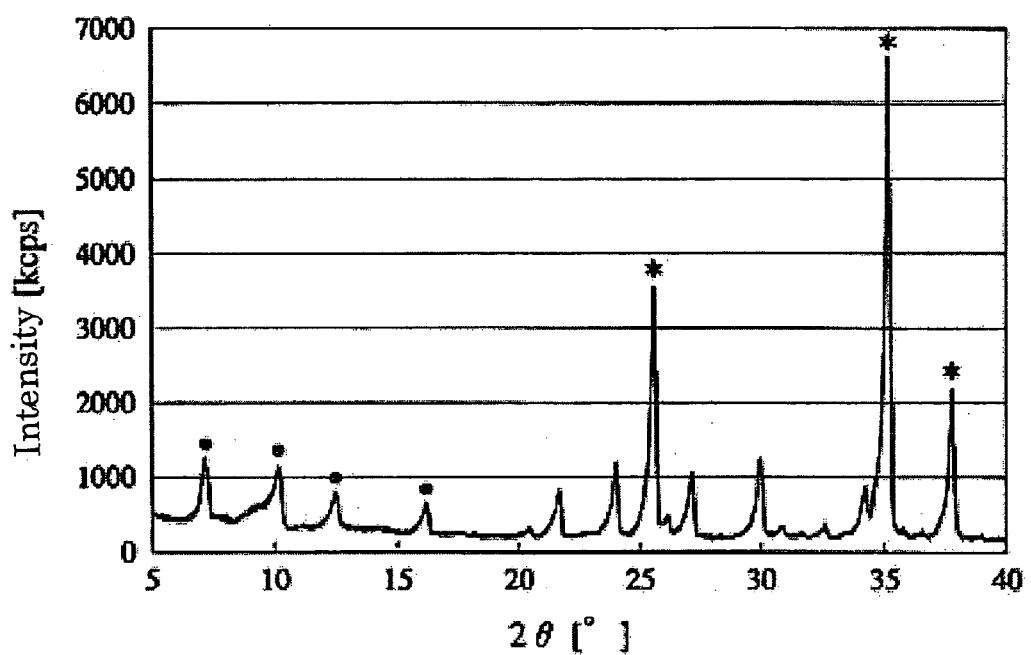
FIG. 15 is a chart showing the X-ray diffraction pattern of the zeolite tubular separation membrane of Example 2.
Figure 16:
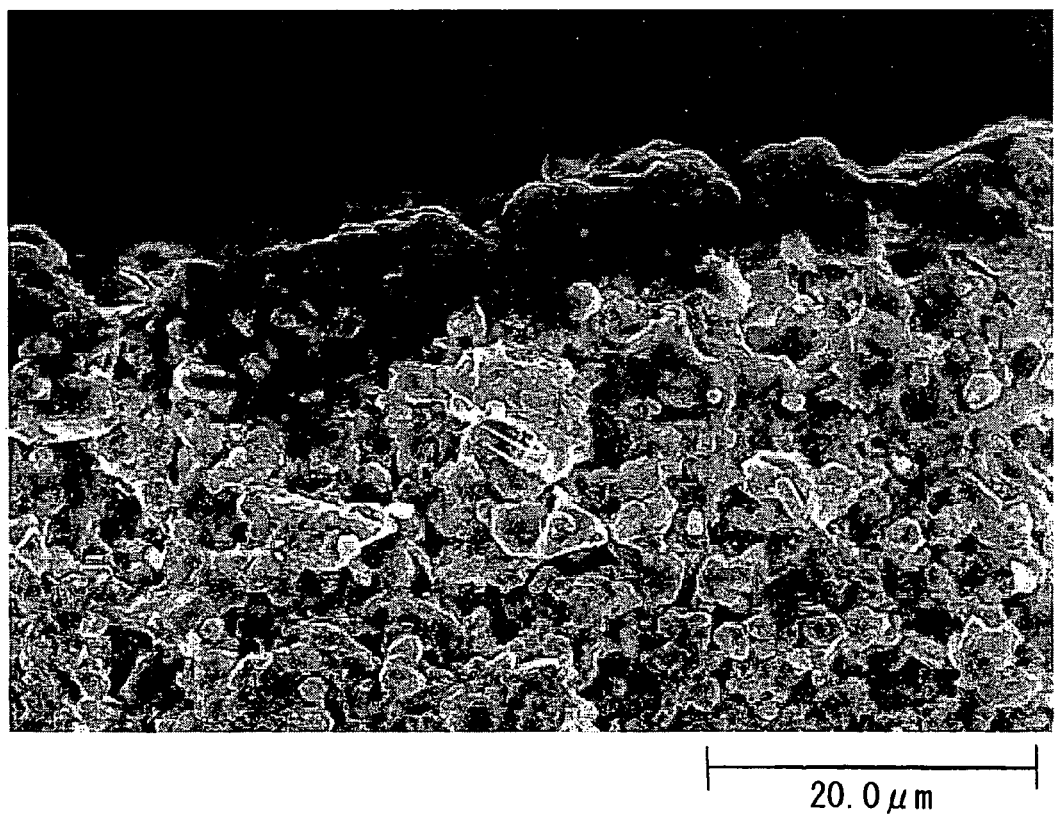
FIG. 16 is a scanning electron photomicrograph of a section of the zeolite tubular separation membrane of Example 2.
Figure 17:
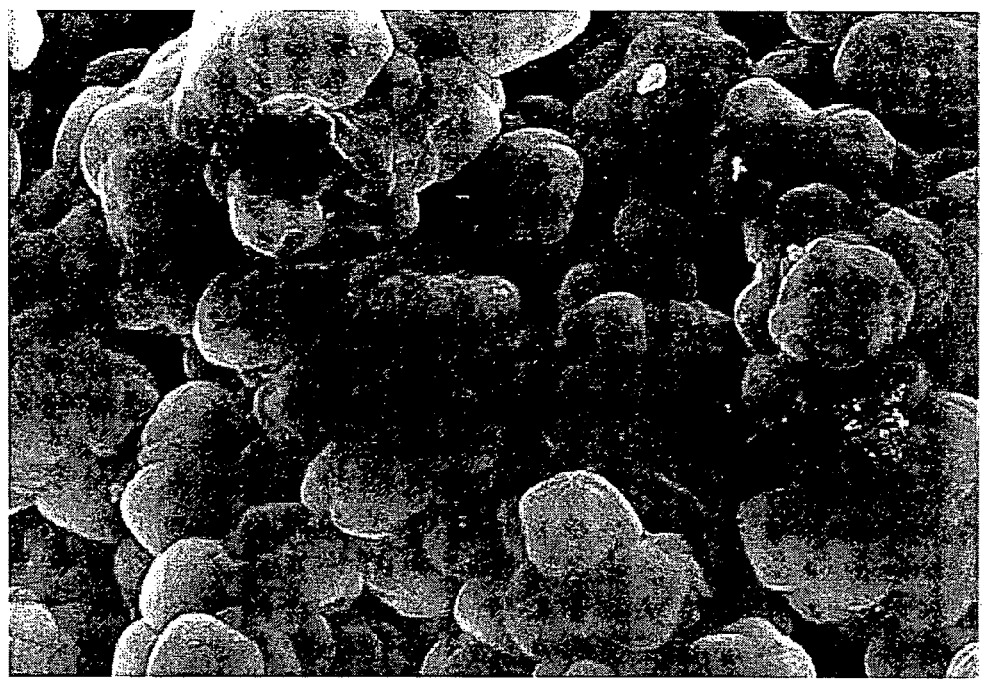
FIG. 17 is a scanning electron photomicrograph of the surface of the zeolite tubular separation membrane of Example 2.

A clear solution having an A-type zeolite composition described in H. Robson, "Verified Synthesis of Zeolite Materials," Elsevier Science (2001) was prepared, and a zeolite membrane was prepared in the same manner as Example 1, except that the clear solution was heated to 80° C. by feeding hot water W from the lower opening 21 to the jacket 2, as shown in FIG. 7, and kept at the same temperature for 2 hours. FIG. 15 shows the X-ray diffraction pattern of the zeolite membrane and FIGS. 16 and 17 show the scanning electron photomicrographs of the surface and a section of the zeolite membrane, respectively. As is evident from FIGS. 15 to 17, an A-type zeolite crystal layer with uniform thickness was formed. The separation membrane was evaluated for separation performance in the same manner as Example 1. The result is shown in Table 1. The amount of the liquid having permeated through the separation membrane 52 was 4 kg/m$^2$·hr.

TABLE 1

| Example No. | Separation factor α |
|---|---|
| 1 | 71281 |
| 2 | 64362 |

Control 1

Hydrothermal synthesis was performed in the same manner as Example 1, except that the porous tubular support was placed vertically in the slurry and the reaction solution was heated in a state of keeping the bottom of the porous tubular support in contact with the container, and thus sealing the inside of the porous support. A zeolite membrane was formed not only on the outer surface, but on the inner surface of the porous tubular support. The observation of the zeolite membrane with a scanning electron microscope revealed that there were defects (pinholes) in the membrane. The separation membrane was evaluated for separation performance in the same manner as Example 1. The separation factor α thus determined was about several hundreds, which indicated that the separation membrane did not have good separation performance.

Figure 18:
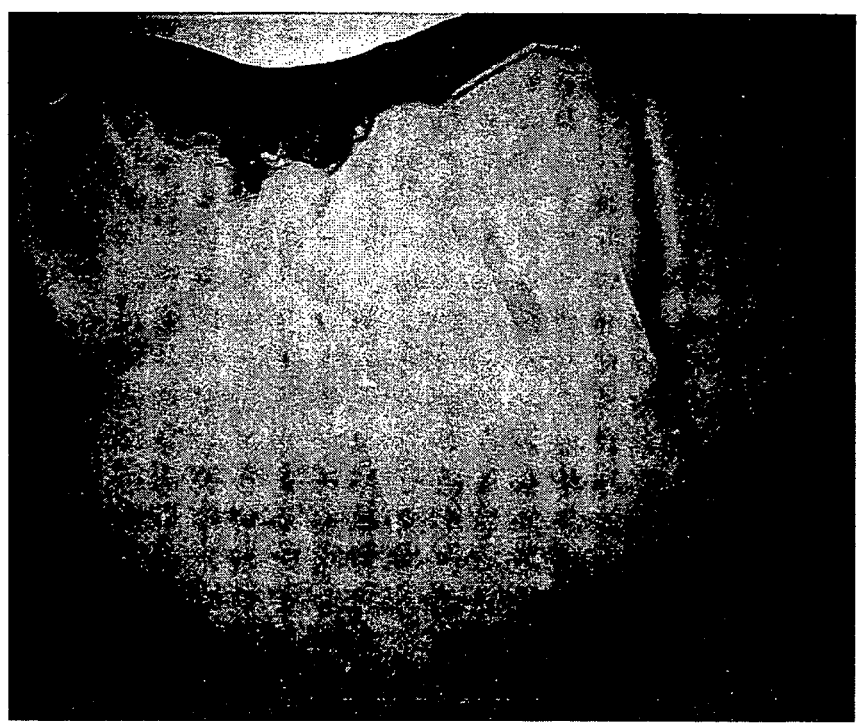
FIG. 18 is a transmission electron photomicrograph of a section of the zeolite tubular separation membrane of Control 1.

A section of the zeolite membrane formed on the outer surface of the porous tubular support was observed with a transmission electron microscope. FIG. 18 is the TEM photomicrograph. FIG. 18 shows that there were some portions in the zeolite membrane where zeolite crystals were not regularly formed. In the portions where zeolite crystals were not regularly formed, voids about several tens nm in diameter occurred. This is probably because desirable convention was not caused during the hydrothermal synthesis, which inhibited geometrical selection from functioning sufficiently during the growth of the zeolite crystals.

The invention claimed is:

1. A zeolite tubular separation membrane comprising a porous tubular support with both ends open and a zeolite membrane which is formed with plural number of A-type zeolite single crystals on a surface of the porous tubular support, wherein A-type zeolite single crystals exposed on the surface of the zeolite membrane each have a growth axis almost perpendicular to the surface of the porous tubular support, and wherein the membrane has grain boundary layers of 5-50 nm in thickness in spaces among the A-type zeolite single crystals exposed on the surface of the zeolite membrane.

* * * * *